United States Patent
Lin et al.

(10) Patent No.: US 9,526,048 B2
(45) Date of Patent: Dec. 20, 2016

(54) METHOD OF HANDLING MEASUREMENT GAP CONFIGURATION AND COMMUNICATION DEVICE THEREOF

(75) Inventors: Shiang-Jiun Lin, New Taipei (TW); Chun-Yen Wang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 69 days.

(21) Appl. No.: 13/099,347

(22) Filed: May 2, 2011

(65) Prior Publication Data

US 2011/0274007 A1    Nov. 10, 2011

Related U.S. Application Data

(60) Provisional application No. 61/331,202, filed on May 4, 2010.

(51) Int. Cl.
| | |
|---|---|
| *H04L 12/28* | (2006.01) |
| *H04W 36/00* | (2009.01) |
| *H04W 24/10* | (2009.01) |
| *H04W 72/00* | (2009.01) |

(52) U.S. Cl.
CPC .......... *H04W 36/0094* (2013.01); *H04L 12/28* (2013.01); *H04W 72/00* (2013.01); *H04W 24/10* (2013.01)

(58) Field of Classification Search
CPC .. H04W 36/0094; H04W 24/10; H04W 72/00; H04L 12/28
See application file for complete search history.

(56) References Cited

U.S. PATENT DOCUMENTS

| | | | |
|---|---|---|---|
| 2008/0189970 A1 | 8/2008 | Wang | |
| 2009/0310563 A1 | 12/2009 | Chou | |
| 2010/0062765 A1 | 3/2010 | Jung | |
| 2010/0267394 A1* | 10/2010 | Wu .............................. | 455/450 |
| 2011/0038271 A1* | 2/2011 | Shin et al. .................. | 370/252 |
| 2011/0080962 A1* | 4/2011 | Blankenship et al. ........ | 375/259 |
| 2012/0155312 A1* | 6/2012 | Kim et al. .................... | 370/252 |
| 2012/0294184 A1* | 11/2012 | Jung et al. .................... | 370/252 |

FOREIGN PATENT DOCUMENTS

EP    2 020 822 A1    2/2009

* cited by examiner

*Primary Examiner* — Marsha D Banks Harold
*Assistant Examiner* — Walter Divito
(74) *Attorney, Agent, or Firm* — Winston Hsu; Scott Margo

(57) ABSTRACT

A method of handling measurement gap configuration for a network in a wireless communication system comprising a mobile device capable of receiving and/or transmitting on a plurality of component carriers is disclosed. The method comprises configuring at least a measurement gap configuration each for at least a component carrier of the plurality of component carriers, to the mobile device.

14 Claims, 14 Drawing Sheets

9,526,048 B2

METHOD OF HANDLING MEASUREMENT GAP CONFIGURATION AND COMMUNICATION DEVICE THEREOF

CROSS REFERENCE TO RELATED APPLICATIONS

This application claims the benefit of U.S. Provisional Application No. 61/331,202, filed on May 4, 2010 and entitled "Methods and Systems of Measurement Gap Configuration in Multiple Component Carrier Systems" the contents of which are incorporated herein in their entirety.

BACKGROUND OF THE INVENTION

1. Field of the Invention

The application relates to a method utilized in a wireless communication system and a communication device thereof, and more particularly, to a method of handling measurement gap configuration in a wireless communication system and a related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, an UE may perform measurement to measure communication quality, such as quality of a frequency channel or strength of a radio signal, which is controlled by the E-UTRAN, due to mobility of the UE. Measurement can be divided into two types according to the current operating frequency of the UE, which are an intra-frequency measurement and an inter-frequency/inter-RAT measurement. The intra-frequency measurement is predominantly performed for the mobility within the same frequency channel (i.e. between cells with the same carrier frequency), whereas the inter-frequency/inter-RAT measurement is predominantly performed for the mobility between different frequency channels (i.e. between cells with a different carrier frequency). In addition, the inter-frequency/inter-RAT measurement is performed during uplink/downlink idle periods, such as a measurement gap configured by the network. During the measurement gap, both the uplink and downlink transmissions are prohibited (e.g. no PUCCH, PUSCH, PDCCH, and PDSCH transmissions), and thereby the inter-frequency/inter-RAT measurement can be performed within the measurement gap.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

In the LTE system, measurement functionality is defined for the UE supporting a single component carrier. Therefore, the network configures a measurement gap to the UE only for the component carrier for measurement. However, in the LTE-Advanced system, the measurement functionality is not clear defined for the UE supporting multiple component carriers. In other words, the network does not know how to configure the measurement gap for the multiple component carriers to the UE for measurement. Improper configuration of the measurement gap may cause packet scheduling problems and transmission interruption. Since data transmission/reception (e.g. the uplink and downlink transmissions) cannot be performed during the measurement gap, transmission/reception performance of the UE is downgraded.

SUMMARY OF THE INVENTION

The application discloses a method of handling measurement gap configuration in a wireless communication system and a related communication device in order to solve the abovementioned problem.

A method of handling measurement gap configuration for a network in a wireless communication system comprising a mobile device capable of receiving and/or transmitting on a plurality of component carriers is disclosed. The method comprises configuring at least a measurement gap configuration each for at least a component carrier of the plurality of component carriers, to the mobile device.

A method of handling measurement gap configuration for a network in a wireless communication system comprising a mobile device capable of receiving and/or transmitting on a plurality of component carriers is disclosed. The method comprises configuring one measurement gap configuration to the mobile device with a plurality of gap offsets each for at least a component carrier of the plurality of component carriers.

A method of handling measurement gap configuration for a network in a wireless communication system comprising a mobile device capable of receiving and/or transmitting on a plurality of component carriers is disclosed. The method comprises independently configuring a measurement gap configuration for a component carrier of the plurality of component carriers, to the mobile device when the measurement gap configuration for the component carrier is determined to be configured to the component carrier.

A method of handling measurement gap configuration for a network in a wireless communication system comprising a mobile device capable of receiving and/or transmitting on a plurality of component carriers is disclosed. The method comprises configuring a measurement gap configuration for one of the plurality of component carriers, to the mobile device.

A method of handling measurement gap configuration for a network in a wireless communication system comprising a mobile device capable of receiving and/or transmitting on a plurality of component carriers is disclosed. The method comprises configuring a measurement gap configuration for one component carrier of at least a subset of the plurality of component carriers, to the mobile device.

A method of handling measurement gap configuration for a network in a wireless communication system comprising a mobile device capable of receiving and/or transmitting on a plurality of component carriers is disclosed. The method comprises configuring a measurement gap configuration for all of the plurality of component carriers, to the mobile device.

A network of a wireless communication system for handling measurement gap configuration, the wireless communication system comprising a mobile device capable of receiving and/or transmitting on a plurality of component carriers is disclosed. The network comprises means for receiving data from the mobile device through any of the plurality of component carriers, and means for configuring at least a measurement gap configuration each for at least a component carrier of the plurality of component carriers, to the mobile device.

A network of a wireless communication system for handling measurement gap configuration, the wireless communication system comprising a mobile device capable of receiving and/or transmitting on a plurality of component carriers is disclosed. The network comprises means for receiving data from the mobile device through any of the plurality of component carriers, and means for configuring one measurement gap configuration to the mobile device with a plurality of gap offsets each for at least a component carrier of the plurality of component carriers.

A network of a wireless communication system for handling measurement gap configuration, the wireless communication system comprising a mobile device capable of receiving and/or transmitting on a plurality of component carriers is disclosed. The network comprises means for receiving data from the mobile device through any of the plurality of component carriers, and means for independently configuring a measurement gap configuration for a component carrier of the plurality of component carriers, to the mobile device when the measurement gap configuration for the component carrier is determined to be configured to the component carrier.

A network of a wireless communication system for handling measurement gap configuration, the wireless communication system comprising a mobile device capable of receiving and/or transmitting on a plurality of component carriers is disclosed. The network comprises means for receiving data from the mobile device through any of the plurality of component carriers, and means for configuring a measurement gap configuration for one of the plurality of component carriers, to the mobile device.

A network of a wireless communication system for handling measurement gap configuration, the wireless communication system comprising a mobile device capable of receiving and/or transmitting on a plurality of component carriers is disclosed. The network comprises means for receiving data from the mobile device through any of the plurality of component carriers, and means for configuring a measurement gap configuration for one component carrier of at least a subset of the plurality of component carriers, to the mobile device.

A network of a wireless communication system for handling measurement gap configuration, the wireless communication system comprising a mobile device capable of receiving and/or transmitting on a plurality of component carriers is disclosed. The network comprises means for receiving data from the mobile device through any of the plurality of component carriers, and means for configuring a measurement gap configuration for all of the plurality of component carriers, to the mobile device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
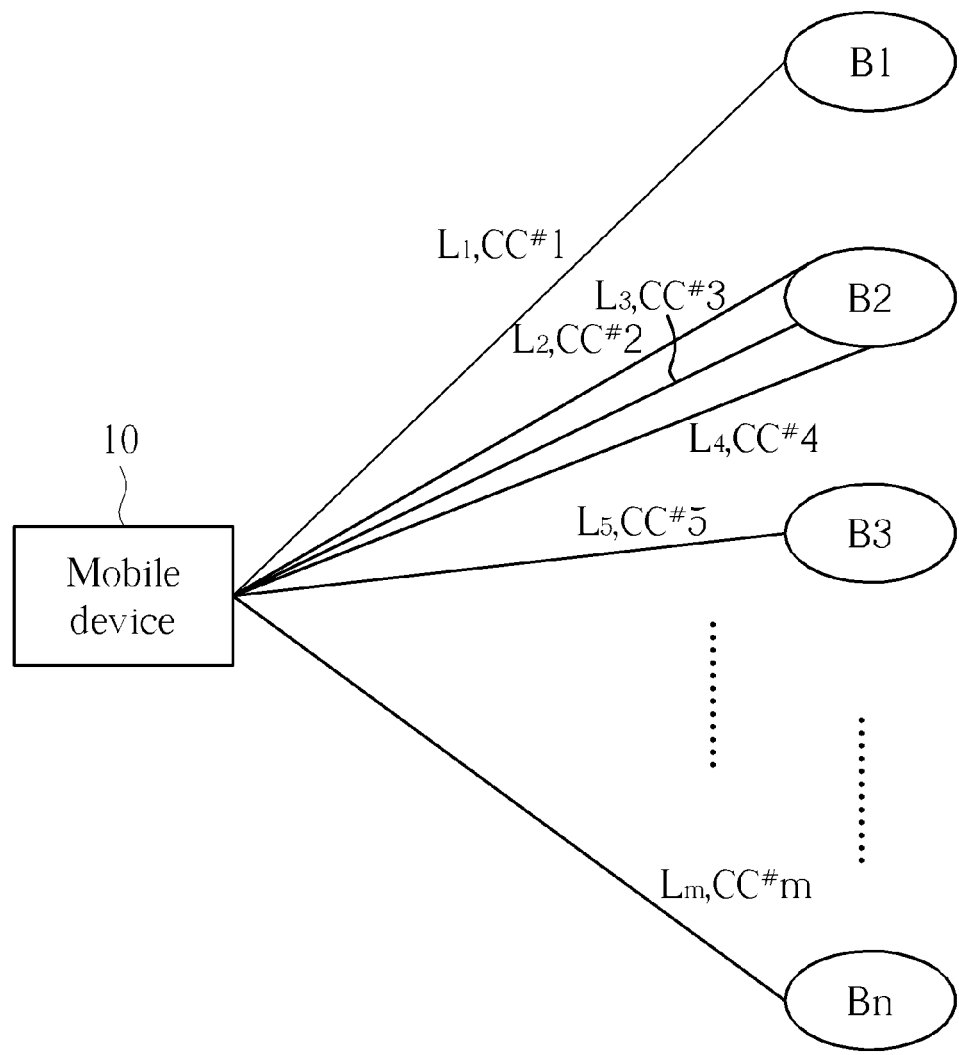
FIG. 1 illustrates a schematic diagram of an exemplary wireless communication system.

Please refer to FIG. 1, which illustrates a schematic diagram of a wireless communication system featuring multiple connections between a mobile device 10 and base stations B1-Bn. The wireless communication system may be a LTE-Advanced system (i.e. an evolved universal terrestrial radio access network (E-UTRAN)) or any other similar network system. The mobile device 10 can operate with carrier aggregation. In FIG. 1, the mobile device 10 communicates with the base stations B1-Bn through radio links $L_1$-$L_m$ that correspond to component carriers cc#1-cc#m configured in the mobile device 10 respectively. Each of the component carriers cc#1-cc#m corresponds to a radio frequency (RF) channel whose bandwidth may be varied according to different communication systems. In addition, the mobile device 10 is referred as an user equipment (UE) or a mobile station (MS), and can be a device such as a mobile phone, a computer system, etc.

In addition, for those skilled in the art, implementations of the carrier aggregation can be achieved by hardware methods. For example, the mobile device 10 includes at least a RF module, and each of the RF modules includes at least a RF chain each corresponding to a component carrier. The network (e.g. an eNB) may autonomously configure measurement gap configuration to the mobile device 10 when the network needs the mobile device 10 to perform inter-frequency/inter-RAT measurement and the mobile device 10 needs the measurement gap. In this case, the eNB requires information of component carrier capability and component carrier usage of the mobile device 10, so as to determine whether/how to configure the measurement gap to the mobile device. On the contrary, the mobile device 10 may request the measurement gap configuration from the network. In this case, the mobile device 10 sends an indication to the eNB according to the component carrier usage of the mobile device 10. For example, the mobile device 10 may have available RF chain, which has not been configured to a component carrier, to perform inter-frequency/inter-RAT measurement, thereby sending an indication message to the eNB to request for releasing the measurement gap configuration in the corresponding RF module. In another example, all the RF chains in a RF module are configured to component carriers, and thereby the UE sends the message to the eNB to request for setting the measurement gap configuration in the RF module.

Note that, during the measurement gap, the UE may switch a RF chain to another frequency to perform inter-frequency/RAT measurement functionality to collect Reference Signal Receiving Power (RSRP), Reference Signal Receiving Quality (RSRQ), and/or Received Signal Strength Indicator (RSSI) of neighbor cells, and finally switch the RF chain back to the serving frequency.

Figure 2:
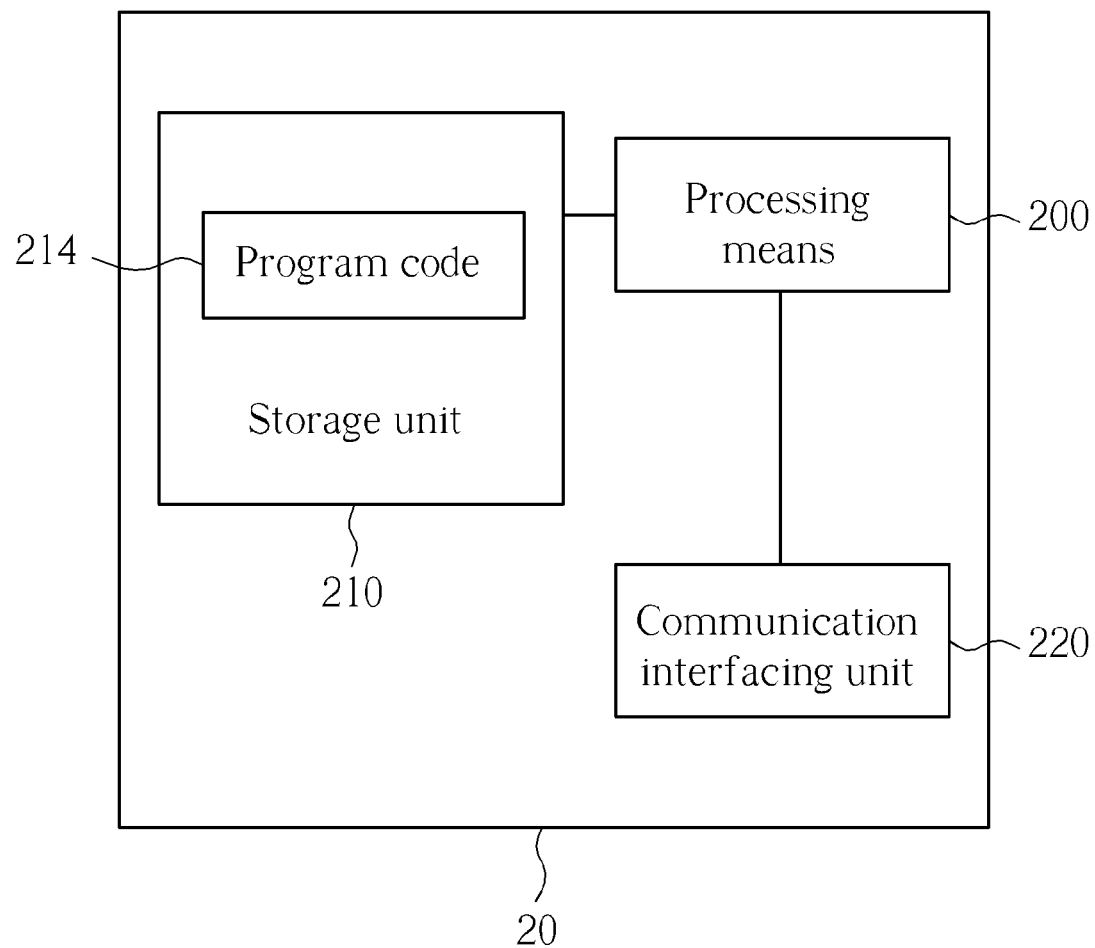
FIG. 2 illustrates a schematic diagram of an exemplary communication device.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

In order to avoid control/data transmission interruptions in multiple component carrier systems (e.g. the LTE-A system) due to measurement gap configuration, the applicant provides several selective configuration methods as following.

Figure 3:
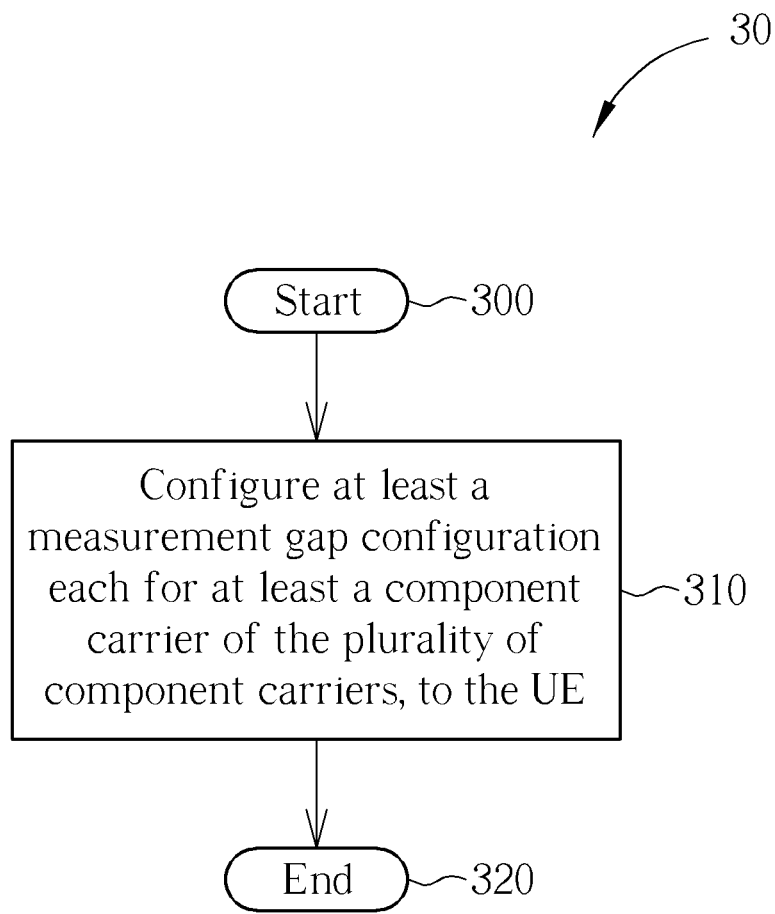
FIG. 3 is a flowchart of an exemplary process.

Please refer to FIG. 3, which illustrates a flowchart of an exemplary process 30. The process 30 is utilized in a network (e.g. an eNB) for handling measurement gap configuration to an UE (as the mobile device 10 of FIG. 1) capable of communicating with the network through a plurality of component carriers. The process 30 can be compiled into the program code 214 and includes the following steps:

Step 300: Start.

Step 310: Configure at least a measurement gap configuration each for at least a component carrier of the plurality of component carriers, to the UE.

Step 320: End.

According to the process 30, the network configures a measurement gap configuration for a group of component carriers to the UE. Thus, every component carrier in the group is applied with the same measurement gap configuration. Note that, the network may configure a plurality of measurement gap configurations to the UE, and thereby the UE applies each of the plurality of measurement gap configurations to a group of component carriers. In a word, the network configures the measurement gap configuration based on the concept of grouping, so as to decrease a signaling number associated with the measurement gap configuration.

For group based measurement gap configuration, the network may configure a measurement gap configuration for a group of component carriers according to a RF module status, a RF chain status, or a component carrier status. For example, the network configures at least a RF module with the same state with a measurement gap configuration, or configures at least a RF chain with the same state with a measurement gap configuration (namely the RF modules or the RF chains applied with the same measurement gap configuration). In some embodiments, the network may configure component carriers with activated state, component carriers with deactivated state, or component carriers with control signaling (e.g. a PDCCH signaling), primary component carriers (PCCs), secondary component carriers (SCCs), component carriers with the same quality level, or component carriers in the same frequency band with a measurement gap configuration.

Figure 4:
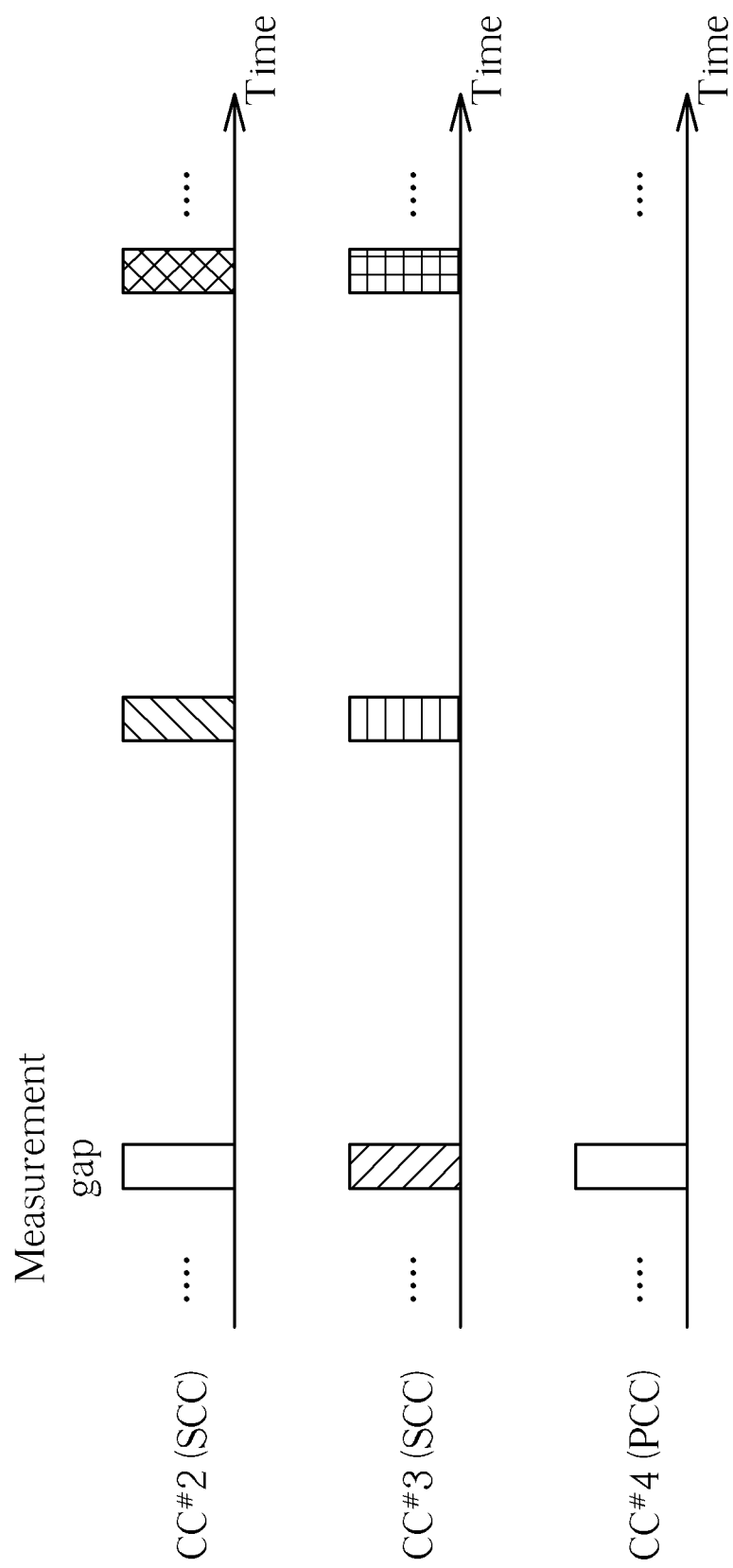
FIG. 4 illustrates a schematic diagram of group based measurement gap configuration.

Take an example based on the process 30. Referring back to FIG. 1, assume the component carriers cc#2-cc#3 are secondary component carriers, and the component carrier cc#4 is a primary component carrier. Please refer to FIG. 4, which is a schematic diagram of group based measurement gap configuration. The network configures a measurement gap configuration only for SCC group in FIG. 4. Therefore, the UE can perform measurement functionality (e.g. inter-frequency/inter-RAT measurement) by switching the operating frequency of RF chain or RF module of those secondary component carriers with the measurement gaps. Note that, the patterns of the measurement gaps represent different measurement frequencies. That is, the UE may utilize the measurement gaps for different frequency measurements.

In addition, the measurement gap configuration includes information associated with the group of component carriers, and the information includes a group identity of the component carrier group, or component carrier identifications each corresponding to a component carrier in the component carrier group. More specifically, the component carrier identifications includes at least one of a component carrier index, a component carrier frequency, a component carrier physical cell identify (PCI), a component carrier cell global identity (CGI), and a closed subscriber group (CSG) identity.

Figure 5:
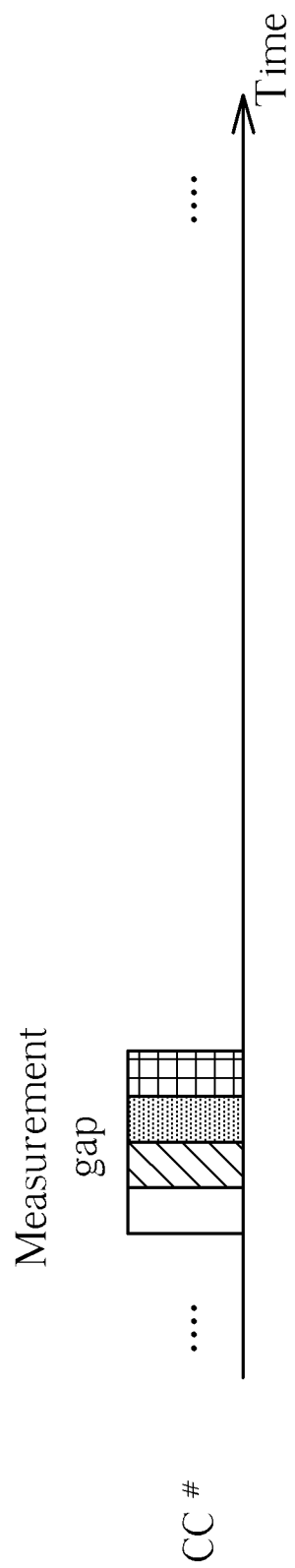
FIG. 5 illustrates a schematic diagram of measurement gap length configuration.

Moreover, the measurement gap configuration may be configurable. For example, the network includes a measurement gap length in the measurement gap configuration. Besides, the measurement gap may be utilized for at least a frequency measurement. Please refer to FIG. 5, which is a schematic diagram of measurement gap length configuration. Assume that the measurement gap length for measuring a frequency is $\alpha$, and the network (e.g. the eNB) configures $n*\alpha$ measurement gap length for any of the component carrier cc#1-cc#m (represented by cc#x in FIG. 5). Therefore, the UE can perform measurements in n frequencies within the measurement gap.

The process 30 clearly specifies how the network configures measurement gap configuration in multiple component carriers. More specifically, the network configures the measurement gap configuration to the UE with a grouping method.

Figure 6:
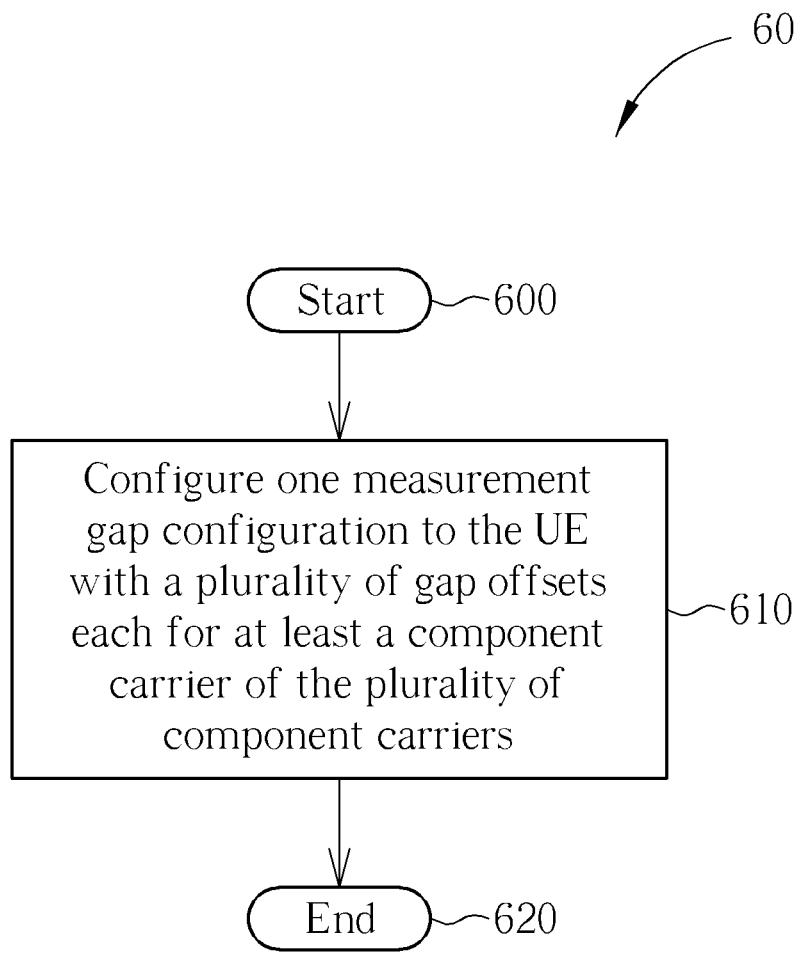
FIG. 6 is a flowchart of an exemplary process.

Please refer to FIG. 6, which illustrates a flowchart of an exemplary process 60. The process 60 is utilized in a network (e.g. an eNB) for handling measurement gap configuration to an UE (as the mobile device 10 of FIG. 1) capable of communicating with the network through a plurality of component carriers. The process 60 can be compiled into the program code 214 and includes the following steps:

Step 600: Start.

Step 610: Configure one measurement gap configuration to the UE with a plurality of gap offsets each for at least a component carrier of the plurality of component carriers.

Step 620: End.

According to the process 60, the network configures a single measurement gap configuration to the UE with gap offsets. That is, the network configures staggered measurement gaps for the plurality of component carriers. Therefore, the UE does not perform measurement (e.g. inter-frequency/inter-RAT measurement) by switching the operating frequency of the RF chains or RF Modules of the plurality of component carriers at the same time due to staggered measurement gaps, so as to enhance transmission efficiency of the UE without interruption on all component carriers for inter-frequency/inter-RAT measurement at the same time.

Figure 7:
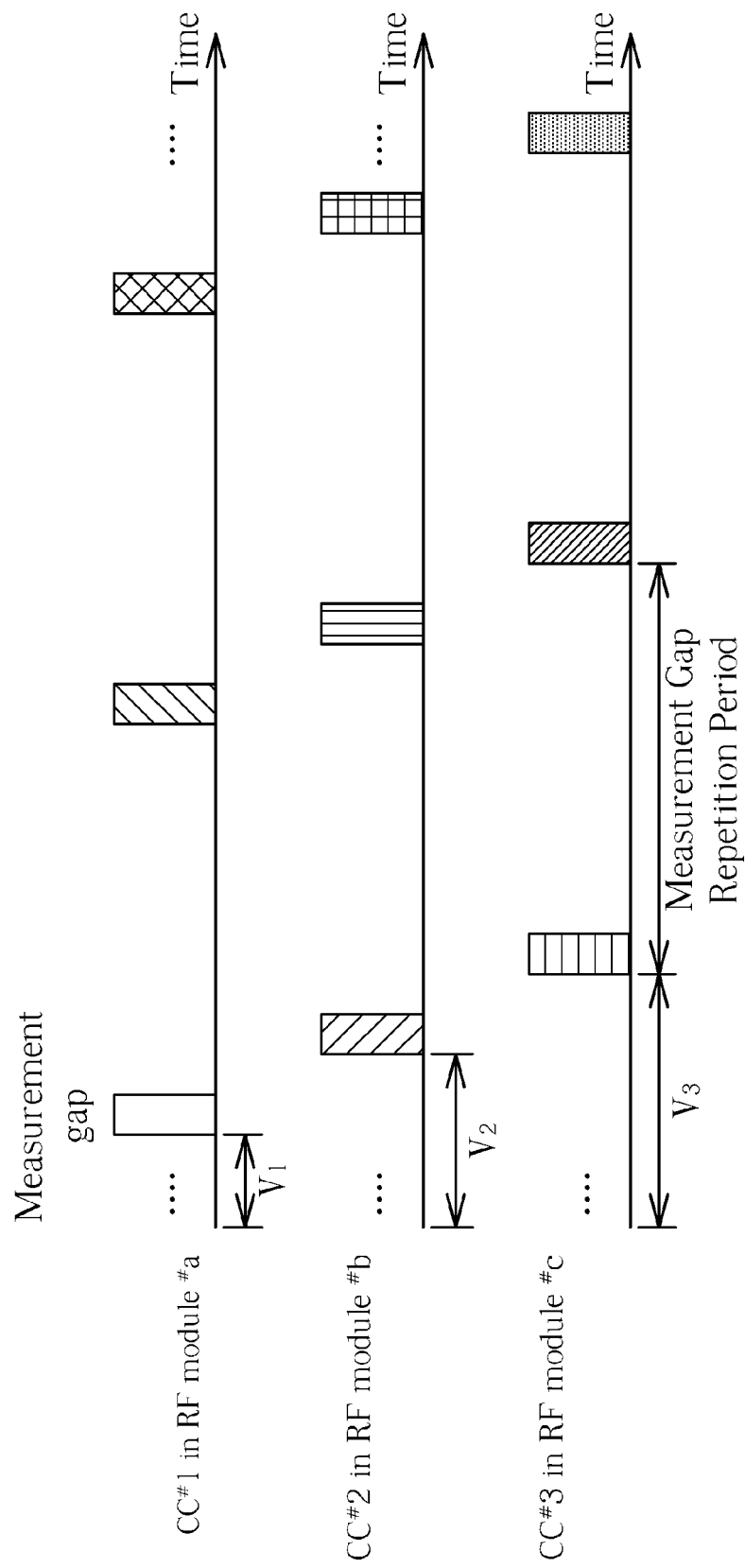
FIG. 7 illustrates a schematic diagram of staggered measurement gap configuration.

Note that, the concept of gap offset can be utilized in the same RF module and/or different RF modules. Referring back to FIG. 1, assume that the component carrier cc#1 in RF module #a, component carrier cc#2 in RF module #b, and component carrier cc#3 in RF module #c. Please refer to FIG. 7, which is a schematic diagram of staggered measurement gap configuration. In an embodiment, the network configures gap offset values V1-V3 to the UE for the measurement gap configuration (i.e. the gap offset values V1-V3 are included in the measurement gap configuration). The UE applies the measurement gap configuration with the gap offset values V1-V3 to the component carrier cc#1-cc#3 in accordance with the order. That is, the UE applies the measurement gap configuration to the component carrier cc#1 with the gap offset value V1, applies the measurement gap configuration to the component carrier cc#2 with the gap offset value V2, and so on. On the other hand, the measurement gap configuration may include the gap offset values V1-V3 along with component carrier identities corresponding to the component carrier cc#1-cc#3. Therefore, the UE can explicitly apply the measurement gap configuration to the component carrier cc#1-cc#3 with the gap offset values V1-V3 according to the component carrier identities. As can be seen in FIG. 7, since the measurement gaps in the component carriers cc#1-cc#3 are shifted based on the gap offset values V1-V3, the UE does not perform measurement for the component carriers cc#1-cc#3 at the same time. Thus, when the UE performs the measurement for the component carrier cc#1 within the measurement gap, the UE can still utilize the component carrier cc#2-cc#3 for transmission, thereby optimizing transmission efficiency of the UE.

Moreover, a length of the measurement gap may be configurable. For example, the network includes measurement gap length in the measurement gap configuration, and the measurement gap can be utilized for at least a frequency measurement. The detailed description can be referred from above, so it is not given herein.

The process 60 clearly specifies how the network configures measurement gap configuration in multiple component carriers. More specifically, the network configures the measurement gap configuration to the UE with stagger method.

Figure 8:
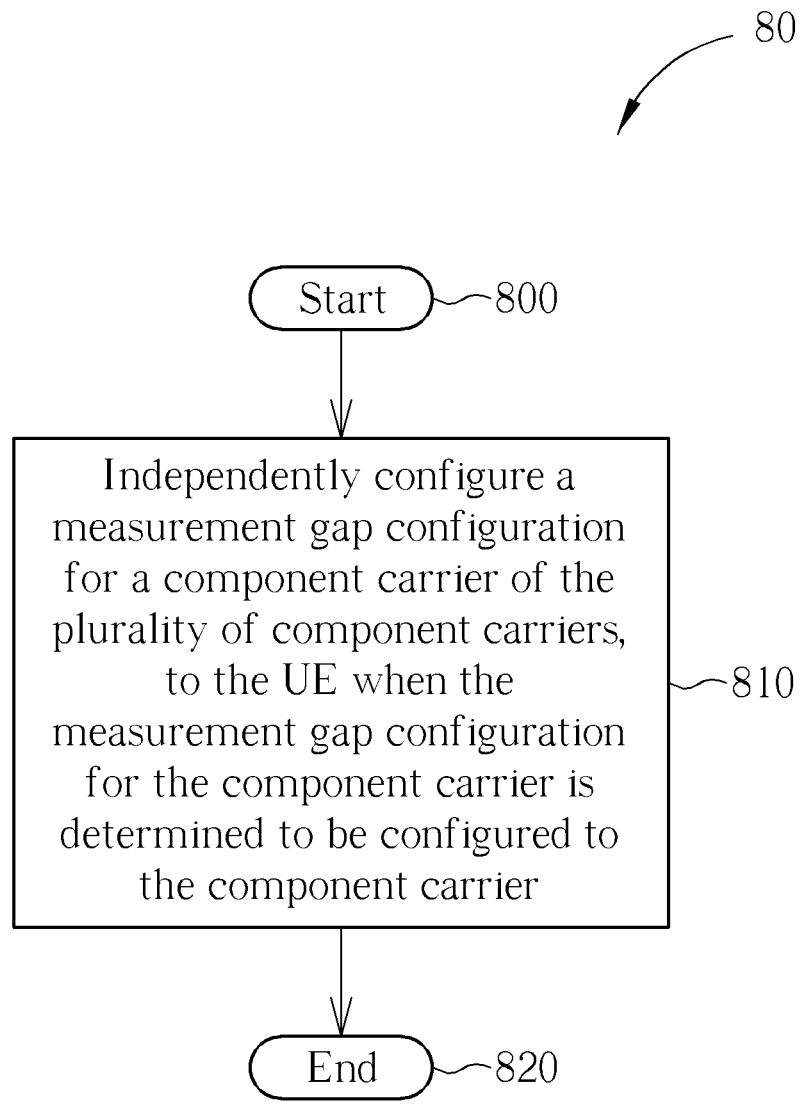
FIG. 8 is a flowchart of an exemplary process.

Please refer to FIG. 8, which illustrates a flowchart of an exemplary process 80. The process 80 is utilized in a network (e.g. an eNB) for handling measurement gap configuration to an UE (as the mobile device 10 of FIG. 1) capable of communicating with the network through a plurality of component carriers. The process 80 can be compiled into the program code 214 and includes the following steps:

Step 800: Start.

Step 810: Independently configure a measurement gap configuration for a component carrier of the plurality of component carriers, to the UE when the measurement gap configuration for the component carrier is determined to be configured to the component carrier.

Step 820: End.

According to the process 80, the network determines whether to configure the measurement gap configuration for any of the plurality of component carriers, and configures the measurement gap configurations for the component carriers that are determined to be configured by the network. In other words, the network configures a first measurement gap configuration for a first component carrier of the plurality of component carriers, configure a second measurement gap configuration for a second component carrier, and may not configure a measurement gap configuration for a third component carriers. Therefore, flexibility of configuring the measurement gap for multiple component carriers is increased.

Figure 9:
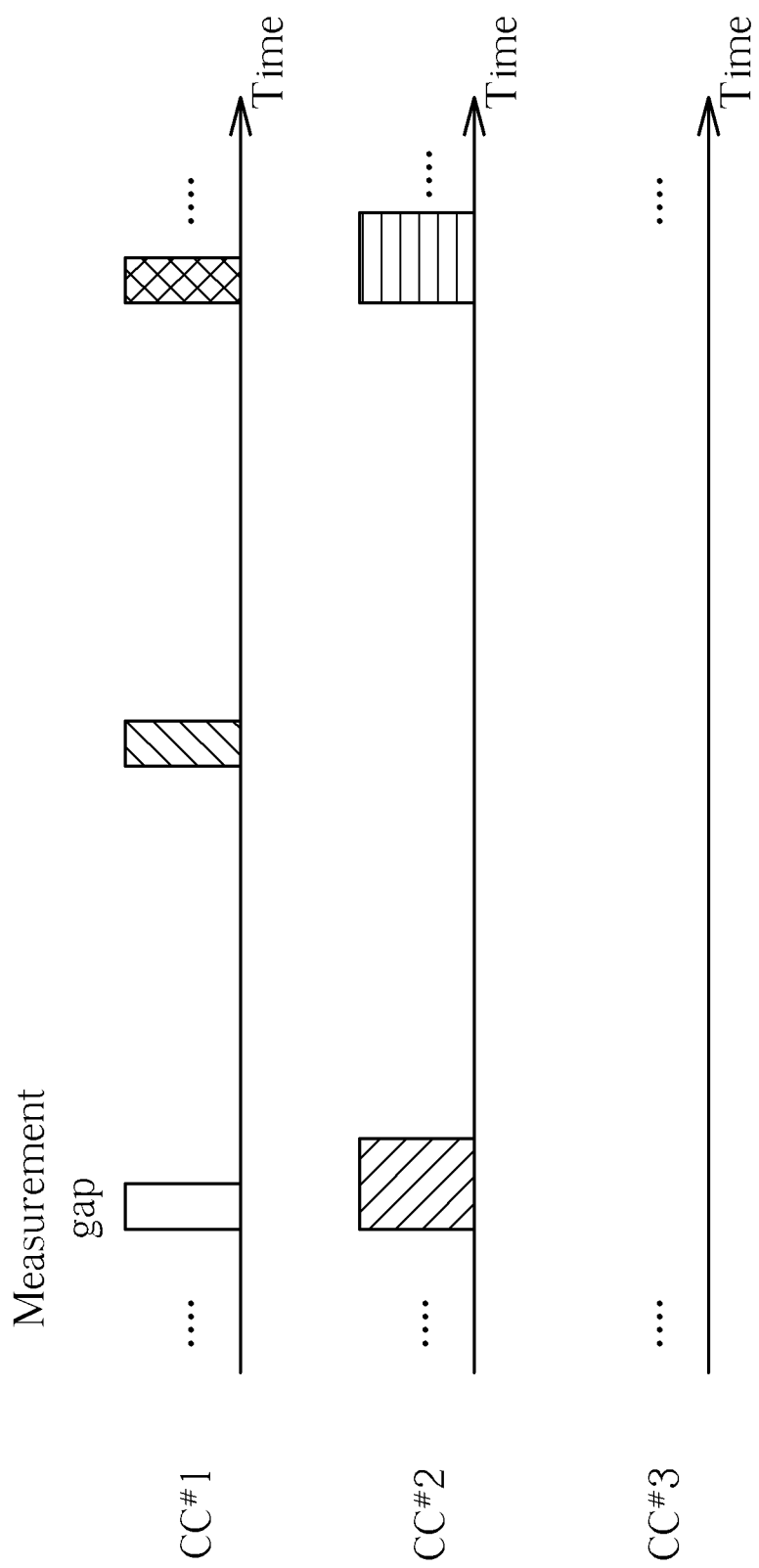
FIG. 9 illustrates a schematic diagram of independent measurement gap configuration.

Take an example based on the process 80. Please refer to FIG. 9, which is a schematic diagram of independent measurement gap configuration. Briefly, only three component carriers cc#1-cc#3 are presented in FIG. 9. Since the network individually configures the measurement gap configuration for each of the component carriers cc#1-cc#3, the network can configure different measurement gap configurations for the component carriers cc#1-cc#3. As can be seen in FIG. 9, the UE configures measurement gap pattern #x for component carrier cc#1, configures measurement gap pattern #y for component carrier cc#2, and may not configure measurement gap for component carrier cc#3. Moreover, the measurement gap lengths of the measurement gap patterns #x and #y may be the same or different. That is, a length of the measurement gap may be configurable. For example, the network includes measurement gap length in the measurement gap configuration, and the measurement gap can be utilized for at least a frequency measurement. The detailed description can be referred from above, so it is not given herein.

In addition, the measurement gap configuration may include a component carrier identification corresponding to the configured component carrier, so that the UE knows which component carrier is configured with measurement gap configuration according to the component carrier identification. Note that, the component carrier identification may be a component carrier index, a component carrier frequency, a component carrier PCI, a component carrier CGI, or a CSG identity.

The process 80 clearly specifies how the network configures measurement gap configuration in multiple component carriers. More specifically, the network configures the measurement gap configurations for the component carriers independently. Therefore, measurement gap configuration for a component carrier does not affect other component carriers.

Figure 10:
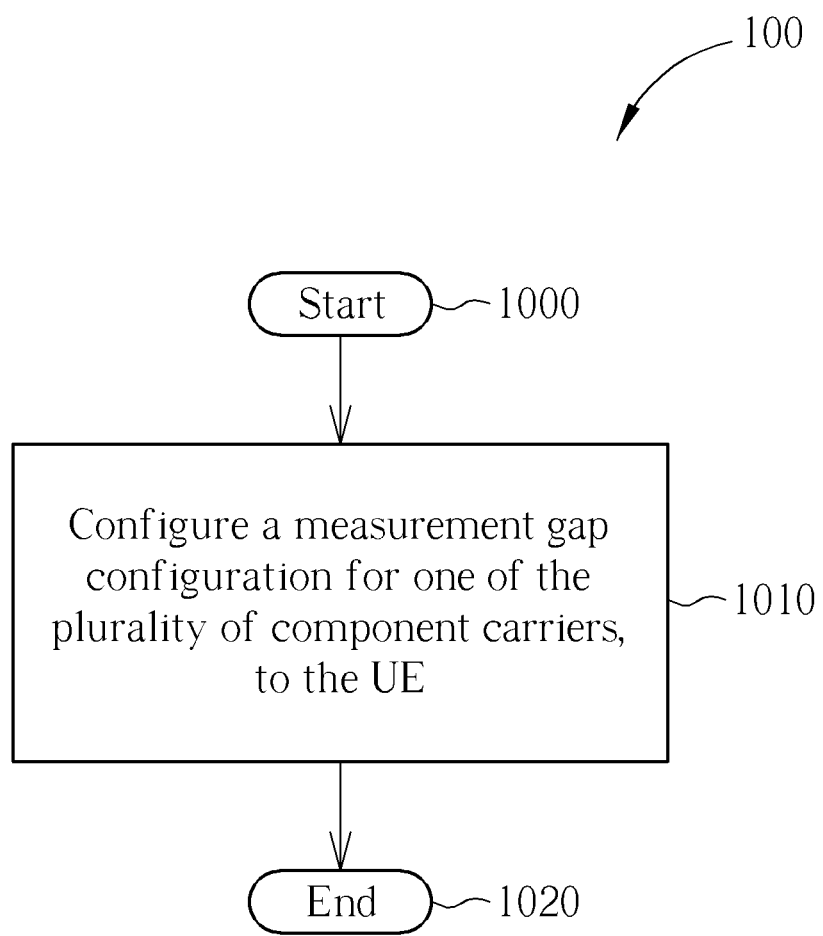
FIG. 10 is a flowchart of exemplary process.

Please refer to FIG. 10, which illustrates a flowchart of an exemplary process 100. The process 100 is utilized in a network (e.g. an eNB) for handling measurement gap configuration to an UE (as the mobile device 10 of FIG. 1) capable of communicating with the network through a plurality of component carriers. The process 100 can be compiled into the program code 214 and includes the following steps:

Step 1000: Start.

Step 1010: Configure a measurement gap configuration for one of the plurality of component carriers, to the UE.

Step 1020: End.

According to the process 100, the network configures the measurement gap configuration to the UE only in a single component carrier. Therefore, the UE performs measurement (e.g. inter-frequency/inter-RAT measurement) with interruption on the component carrier with the measurement gap on the component carrier, thereby avoiding affecting transmission of other component carriers, so as to optimize transmission performance of the UE.

Take an example based on the process 100. Referring back to FIG. 1, the network configures measurement gap configuration only for the component carrier cc#1. Under this situation, the component carrier cc#1 stops performing data transmission/reception within the measurement gap, but to perform the inter-frequency/inter-RAT measurement. On the other hand, the component carriers cc#2-cc#m can continue the data transmission/reception without measurement gap influence, thereby increasing transmission efficiency of the UE.

Moreover, a length of the measurement gap may be configurable. For example, the network includes measurement gap length in the measurement gap configuration, and the measurement gap can be utilized for at least a frequency measurement. The detailed description can be referred from above, so it is not given herein.

In addition, the measurement gap configuration may include a component carrier identification corresponding to the configured component carrier, so that the UE knows which component carrier is configured with measurement gap configuration according to the component carrier identification. Note that, the component carrier identification may be a component carrier index, a component carrier frequency, a component carrier PCI, a component carrier CGI, or a CSG identity.

The process 100 clearly specifies how the network configures measurement gap configuration in multiple component carriers. More specifically, the network configures the measurement gap configuration in a single component carrier.

Figure 11:
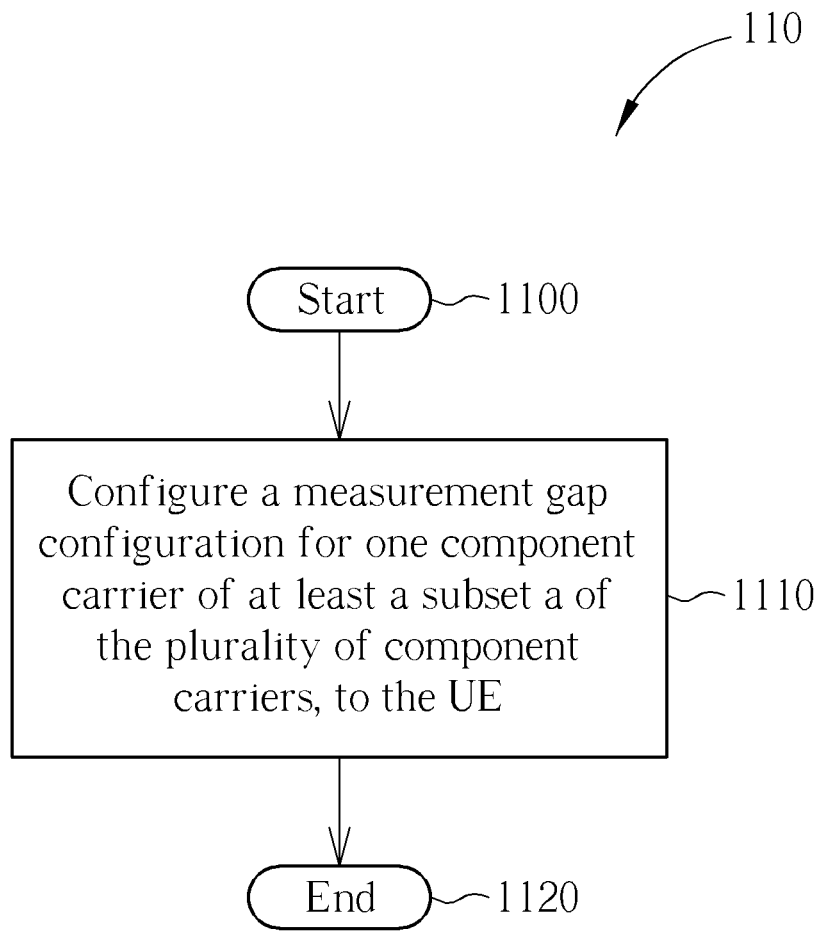
FIG. 11 is a flowchart of exemplary process.

Please refer to FIG. 11, which illustrates a flowchart of an exemplary process 110. The process 110 is utilized in a network (e.g. an eNB) for handling measurement gap configuration to an UE (as the mobile device 10 of FIG. 1) capable of communicating with the network through a plurality of component carriers. The process 110 can be compiled into the program code 214 and includes the following steps:

Step 1100: Start.

Step 1110: Configure a measurement gap configuration for one component carrier of at least a subset of the plurality of component carriers, to the UE.

Step 1120: End.

According to the process 110, the network configures a measurement gap configuration to the UE in a single component carrier of a subset of the plurality of component carriers. Therefore, the UE performs measurement (e.g. inter-frequency/inter-RAT measurement) by switching the operating frequency of the RF chains or RF Modules of the one component carrier of the subset, thereby avoiding affecting transmission of other component carriers of the subset, so as to optimize transmission performance of the UE.

Figure 12:
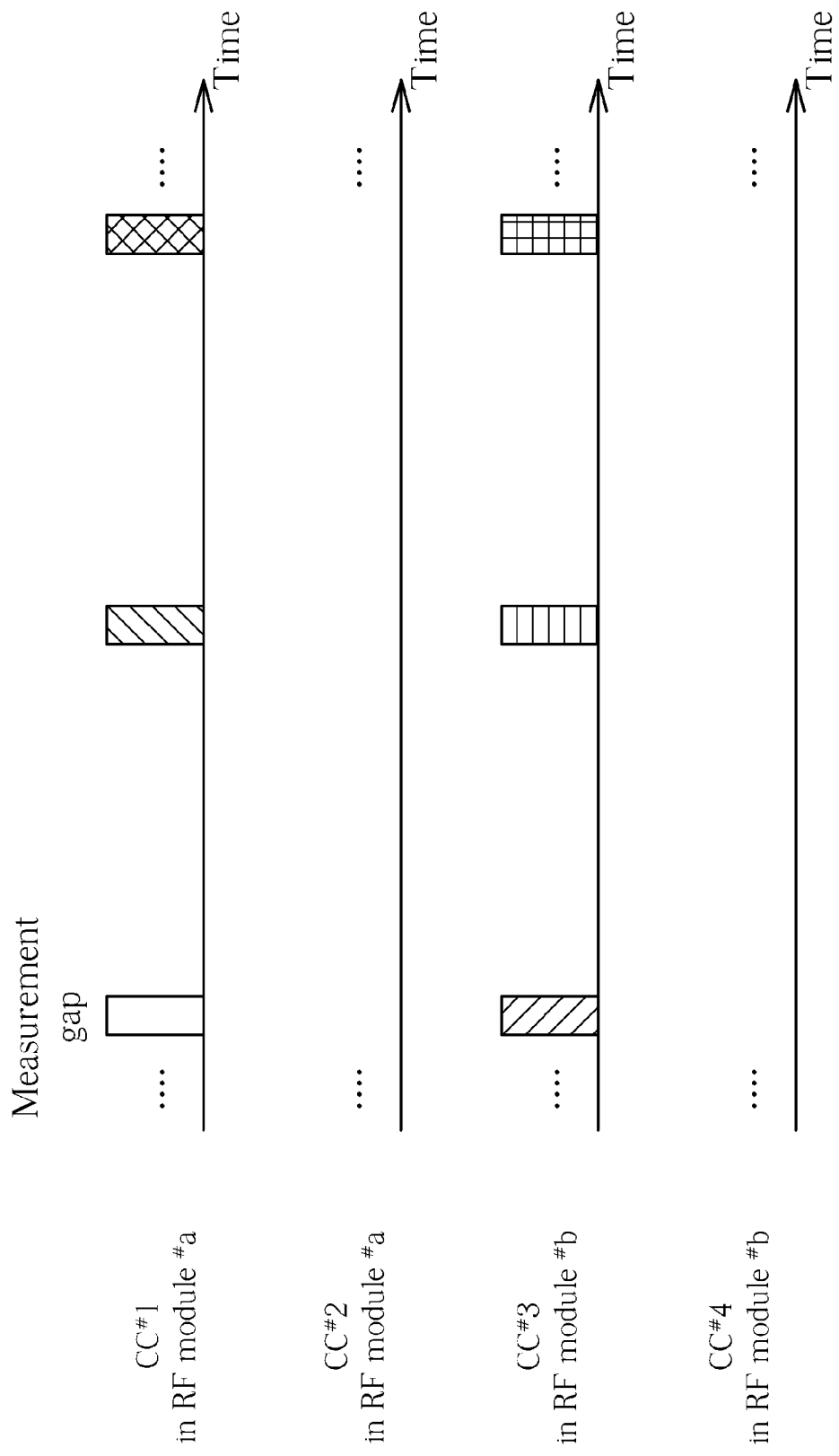
FIG. 12 illustrates a schematic diagram of measurement gap configuration in a single component carrier.

Note that, the subset of the plurality of component carriers may be component carriers in a RF module. Thus, the network may configure measurement gap configuration to the UE in a single component carrier when the UE equips with one RF module. On the other hand, the network may configure measurement gap configuration to the UE in a single component carrier in each RF module when the UE equips with multiple RF modules. For example, please refer to FIG. 12, which is a schematic diagram of measurement gap configuration in a single component carrier. As can be seen in FIG. 12, the network configures measurement gap configuration to the UE in the component carrier cc#1 in the RF module #a and component carrier cc#3 in the RF module #b, whereas the component carrier cc#2 in the RF module #a and the component carrier cc#4 in the RF module #b are not configured with any measurement gap configuration. Under this situation, the component carriers cc#1 and cc#3 that are configured with the same or different measurement gaps may not perform data transmission/reception within the corresponding measurement gaps, but perform the inter-frequency/inter-RAT measurement, whereas the component carriers cc#2 and cc#4 that are not configured with measurement gaps can continue the data transmission/reception without measurement gap influence, thereby increasing transmission efficiency of the UE.

In addition, the measurement gap configuration may include a component carrier identification corresponding to the configured component carrier or a component carrier group identification corresponding to a subset of the plurality of component carriers, so that the UE knows which component carrier is configured with measurement gap configuration according to the component carrier identification. Note that, the component carrier identification may be a component carrier index, a component carrier frequency, a component carrier PCI, a component carrier CGI, or a CSG identity. The component carrier group identification may be a RF module identification, or a RF chain identification.

Moreover, a length of the measurement gap may be configurable. The detailed description can be referred from above, so it is not given herein.

Figure 13:
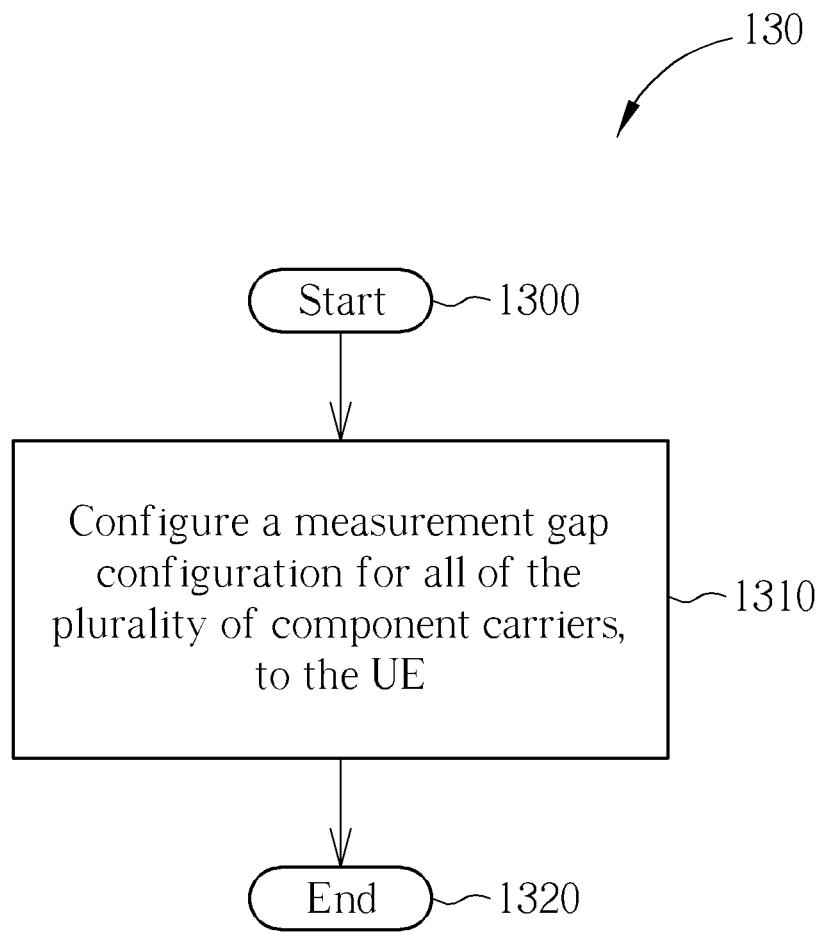
FIG. 13 is a flowchart of exemplary process.

Please refer to FIG. 13, which illustrates a flowchart of an exemplary process 130. The process 130 is utilized in a network (e.g. an eNB) for handling measurement gap configuration to an UE (as the mobile device 10 of FIG. 1) capable of communicating with the network through a plurality of component carriers. The process 130 can be compiled into the program code 214 and includes the following steps:

Step 1300: Start.

Step 1310: Configure a measurement gap configuration for all of the plurality of component carriers, to the UE.

Step 1320: End.

According to process 130, the network configures a common measurement gap configuration to the UE, and thereby the UE applies the measurement gap configuration for all of the plurality of component carriers. That is, all of the component carriers are applied with the same measurement gap configuration. Therefore, the network can jointly control the measurement for all of the plurality component carriers, and a signaling number for the measurement gap configuration is decreased.

Figure 14:
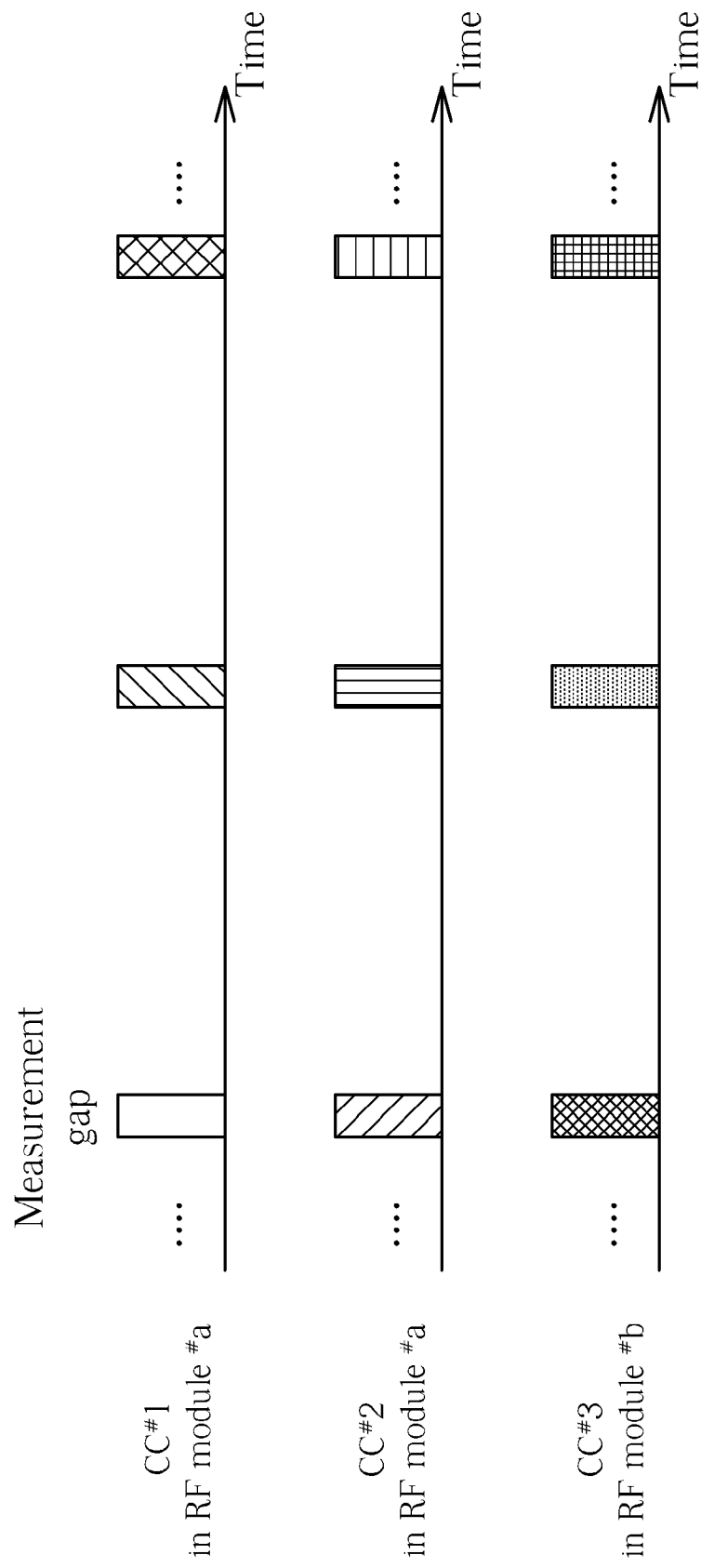
FIG. 14 illustrates a schematic diagram of common measurement gap configuration.

Take an example based on the process 130. Please refer to FIG. 14, which is a schematic diagram of common measurement gap configuration. Briefly, only three component carriers cc#1-cc#3 are presented in FIG. 9. The network configures one measurement gap configuration to the UE. The UE applies the measurement gap configuration for the component carriers cc#1-cc#3 in RF modules #a and #b. Note that, the configured component carriers cc#1-cc#3 can be set to measure different frequency/different RAT within the measurement gaps by the UE.

In addition, a length of the measurement gap may be configurable. For example, the network includes measurement gap length in the measurement gap configuration, and the measurement gap can be utilized for at least a frequency measurement. The detailed description can be referred from above, so it is not given herein.

The process 130 clearly specifies how the network configures measurement gap configuration in multiple component carriers. More specifically, the network configures a common measurement gap configuration for all of the plurality of component carriers.

In conclusion, the present invention provides methods and apparatus for handling measurement gap configuration, so as to mitigate effect of transmission interruption, thereby optimizing transmission performance of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling measurement gap configuration for a network in a wireless communication system comprising a mobile device capable of receiving on a plurality of component carriers, the method comprising:
configuring one measurement gap configuration to the mobile device with a first gap offset for at least a first component carrier of the plurality of component carriers and with a second gap offset for at least a second component carrier of the plurality of component carriers, wherein each of the first and second gap offsets indicates a value for shifting a measurement gap in one of the at least a first and second component carriers of the plurality of component carriers, whereby the mobile device configured with the one measurement gap configuration performs measurement by the at least a first component carrier according to the first gap offset at different time from the mobile device performs measurement by the at least a second component carrier according to the second gap offset.

2. The method of claim 1, wherein the first and second gap offsets are included in the measurement gap configuration, and each of the plurality of gap offsets includes a component carrier identity corresponding to a component carrier of the plurality of component carriers.

3. The method of claim 1, wherein the measurement gap configuration includes a measurement gap length for at least a frequency measurement.

4. The method of claim 1, wherein the measurement gap configuration is autonomously configured by the network or is requested by the mobile device.

5. The method of claim 4, wherein the measurement gap configuration is autonomously configured by the network according to information related to a component carrier capability, a component carrier channel quality and a component carrier usage of the mobile device, or is requested by the mobile device according to the component carrier usage or capability.

6. A method of handling measurement gap configuration for a mobile device capable of receiving on a plurality of component carriers in a wireless communication system, the method comprising:
receiving one measurement gap configuration with a first gap offset for at least a first component carrier of the plurality of component carriers and with a second gap offset for at least a second component carrier of the plurality of component carriers, from a network of the wireless communication system, wherein each of the first and second gap offsets indicates a value for shifting a measurement gap in one of the at least a first and second component carriers of the plurality of component carriers; and
performing a measurement by the at least a first component carrier according to the first gap offset at different time from performing a measurement by the at least a second component carrier according to the second gap offset.

7. A method of handling measurement gap configuration for a mobile device capable of receiving on a plurality of component carriers in a wireless communication system, the method comprising:
receiving a first measurement gap configuration for a first component carrier of the plurality of component carriers, from a network of the wireless communication system, wherein the first measurement gap configuration includes a first gap offset corresponding to the first component carrier and the first gap offset indicates a first value for shifting a first measurement gap in the first component carrier;
receiving a second measurement gap configuration for a second component carrier of the plurality of component carriers, from the network, wherein the second measurement gap configuration includes a second gap offset corresponding to the second component carrier and the second gap offset indicates a second value for shifting a second measurement gap in the second component carrier; and
performing a first measurement on the first component carrier according to the first measurement gap configuration, and performing a second measurement on the second component carrier according to the second measurement gap configuration.

8. A network of a wireless communication system for handling measurement gap configuration, the wireless communication system comprising a mobile device capable of receiving on a plurality of component carriers, the network comprising:
a storage unit for storing instructions of:
receiving data from the mobile device through any of the plurality of component carriers; and
configuring one measurement gap configuration to the mobile device with a first gap offset for at least a first component carrier of the plurality of component carriers and with a second gap offset for at least a second component carrier of the plurality of component carriers, wherein each of the first and second gap offsets indicates a value for shifting a measurement gap in one of the at least a first and second component carriers of the plurality of component carriers, whereby the mobile device configured with the one measurement gap configuration performs measurement by the at least a first component carrier according to the first gap offset at different time from the mobile device performs measurement by the at least a second component carrier according to the second gap offset; and
a processing means, coupled to the storage unit, configured to execute the instructions stored in the storage unit.

9. The network of claim 8, wherein the first and second gap offsets are included in the measurement gap configuration, and each of the plurality of gap offsets includes a component carrier identity corresponding to a component carrier of the plurality of component carriers.

10. The network of claim 8, wherein the measurement gap configuration includes a measurement gap length for at least a frequency measurement.

11. The network of claim 8, wherein the measurement gap configuration is autonomously configured by the network or is requested by the mobile device.

12. The network of claim 11, wherein the measurement gap configuration is autonomously configured by the network according to information related to a component carrier capability, a component carrier channel quality and a component carrier usage of the mobile device, or is requested by the mobile device according to the component carrier usage or capability.

13. A mobile device of a wireless communication system for handling measurement gap configuration, the mobile device capable of receiving on a plurality of component carriers, the mobile device comprising:
   a storage unit for storing instructions of:
      receiving one measurement gap configuration with a first gap offset for at least a first component carrier of the plurality of component carriers and with a second gap offset for at least a second component carrier of the plurality of component carriers, from a network of the wireless communication system, wherein each of the first and second gap offsets indicates a value for shifting a measurement gap in one of the at least a first and second component carriers of the plurality of component carriers; and
      performing a measurement by the at least a first component carrier according to the first gap offset at different time from the mobile device performs measurement by the at least a second component carrier according to the second gap offset; and
   a processing means, coupled to the storage unit, configured to execute the instructions stored in the storage unit.

14. A mobile device of a wireless communication system for handling measurement gap configuration, the mobile device capable of receiving on a plurality of component carriers, the mobile device comprising:
   a storage unit for storing instructions of:
      receiving a first measurement gap configuration for a first component carrier of the plurality of component carriers, from a network of the wireless communication system, wherein the first measurement gap configuration includes a first gap offset corresponding to the first component carrier and the first gap offset indicates a first value for shifting a first measurement gap in the first component carrier;
      receiving a second measurement gap configuration for a second component carrier of the plurality of component carriers, from the network, wherein the second measurement gap configuration includes a second gap offset corresponding to the second component carrier and the second gap offset indicates a second value for shifting a second measurement gap in the second component carrier; and
      performing a first measurement on the first component carrier according to the first measurement gap configuration, and performing a second measurement on the second component carrier according to the second measurement gap configuration; and
   a processing means, coupled to the storage unit, configured to execute the instructions stored in the storage unit.

* * * * *